United States Patent
Baldwin et al.

(10) Patent No.: US 7,080,566 B2
(45) Date of Patent: Jul. 25, 2006

(54) RANGED SINGLE CLUTCH LAYSHAFT POWERSHIFT AUTOMATIC TRANSMISSION

(75) Inventors: Reid Baldwin, Howell, MI (US); David Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 10/803,652

(22) Filed: Mar. 18, 2004

(65) Prior Publication Data

US 2005/0204841 A1   Sep. 22, 2005

(51) Int. Cl.
*F16H 3/08* (2006.01)

(52) U.S. Cl. .......................... 74/331; 74/329

(58) Field of Classification Search ............... 74/331, 74/325, 329, 330
See application file for complete search history.

(56) References Cited

U.S. PATENT DOCUMENTS

| | | | |
|---|---|---|---|
| 2,280,683 A * | 4/1942 | Bedford ............... | 192/54.51 |
| 2,500,308 A * | 3/1950 | Campodonico et al. ....... | 74/331 |
| 2,612,787 A * | 10/1952 | Youngren et al. ........... | 74/330 |
| 2,658,405 A * | 11/1953 | Dodge ................... | 74/331 |
| 4,222,281 A | 9/1980 | Mylenek | |
| 4,811,655 A * | 3/1989 | Janiszewski ............ | 74/331 |
| 5,014,566 A * | 5/1991 | Kashiwase ............. | 74/331 |
| 5,070,978 A | 12/1991 | Pires | |
| 5,425,283 A * | 6/1995 | Wehking .............. | 74/331 |
| 5,597,057 A | 1/1997 | Ruth et al. | |
| 5,720,203 A * | 2/1998 | Honda et al. .......... | 74/325 |
| 5,823,051 A * | 10/1998 | Hall, III ............. | 74/325 |
| 6,065,576 A | 5/2000 | Shaw et al. | |
| 6,880,418 B1 * | 4/2005 | Janson et al. ......... | 74/331 |
| 6,886,424 B1 * | 5/2005 | Janson et al. ......... | 74/329 |

* cited by examiner

*Primary Examiner*—Tisha Lewis
(74) *Attorney, Agent, or Firm*—David B. Kelley; Macmillan, Sobanski & Todd

(57) ABSTRACT

A power transmission for a motor vehicle includes an input, a first layshaft, a second layshaft, an intermediate layshaft, a first power path for transmitting power between the input and first layshaft and producing a first ratio of a speed of the first layshaft and a corresponding speed of the input, a second power path for transmitting power between the input and second layshaft and producing a second ratio of the speed of the second layshaft and corresponding speed of the input, a speed reduction power path driveably connected to the intermediate layshaft, couplers for the first and second layshafts to various gearsets, a range coupler for coupling the output alternately to the speed reduction power path and the intermediate layshaft, and a clutch for releasably connecting the input and second power path.

31 Claims, 2 Drawing Sheets

| # of Teeth | |
|---|---|
| G1 | 30 |
| G2 | 37 |
| G3 | 31 |
| G4 | 39 |
| G5 | 63 |
| G6 | 37 |
| G7 | 57 |
| G8 | 64 |
| G9 | 47 |
| G10 | 40 |
| G11 | 41 |
| G12 | 60 |
| G13 | 39 |
| G14 | 74 |
| G15 | 74 |
| G16 | 39 |
| G17 | 38 |
| G18 | 37 |

Figure 2

| | Torque Ratio |
|---|---|
| 1st | 5.217 |
| 2nd | 3.955 |
| 3rd | 3.034 |
| 4th | 2.100 |
| 5th | 1.449 |
| 6th | 1.098 |
| 7th | 0.843 |
| 8th | 0.650 |
| Rev | -5.080 |

Figure 3

| | Torque Ratio |
|---|---|
| Alt 1st | 5.322 |
| Alt 2nd | 4.034 |
| Alt 3rd | 3.095 |
| Alt 4th | 2.142 |
| Alt 5th | 1.478 |
| Alt 6th | 1.120 |
| Alt 7th | 0.860 |

Figure 4

RANGED SINGLE CLUTCH LAYSHAFT POWERSHIFT AUTOMATIC TRANSMISSION

BACKGROUND OF THE INVENTION

This invention relates to automatic transmissions having a layshaft kinematic arrangement, particularly to such transmissions having a single input clutch but no torque converter.

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmission generally performs gear ratio changes by first interrupting torque transmitted from the engine to the transmission input, preparing the transmission components associated with the next speed ratio, and then restoring torque. A primary functional feature of ASM transmissions is the need to interrupt power transmitted from the engine to the transmission input shaft before or during each gear ratio change. This requirement can result in low quality gear ratio changes, which a vehicle operator or passenger may sense as noise, vibration and harshness.

A transmission operating in accordance with the present invention avoids entirely any interruption of power during gear ratio changes and avoids the inherent shift quality problems of ASMs. This invention, however, also reduces the magnitude of parasitic losses inherent in the operation of an automatic transmission to a much lower magnitude than is present in a conventional ASM transmission.

In order to use a launch clutch in a heavy vehicle, the transmission must provide a large torque multiplication in first gear. For layshaft transmissions, this typically results in a large center distance, the distance between the main shaft and layshaft, causing a large package size and high inertias. This is especially true with a single clutch design because the driving pinion in first gear, the smaller gear, must be journalled on its shaft. Because the pinion is journalled, its size is limited.

A transmission having a large span usually requires many gear ratios to keep the ratio steps small. Consequently, there are many gears and synchronizers or couplers in large span transmissions.

SUMMARY OF THE INVENTION

A transmission according to this invention includes a range selection synchronizer or coupler. In the three lowest forward gears and reverse gear, the range selection coupler directs power in a path that multiplies torque by two additional meshes. In fifth gear through eighth gear, the range selection coupler bypasses this additional torque multiplication. In fourth gear, the range selection coupler is bypassed, so that its state can be changed without interrupting power flow to the transmission output.

Only one friction clutch for releasably connecting a source of power, such as an engine or motor, and a transmission input is required in a transmission of this invention. Gear ratio changes are accomplished through the use of couplers, such as synchronizers or dog clutches, which mutually driveably connect components operative in each speed ratio, which couplers produce very little drag loss when engaged, and do not require a continuous supply of power to stay engaged.

Power interruption during shifting is avoided by providing alternate torque or power paths, which transmit power between a transmission input and the output during a gear ratio change. A secondary power path bypasses the friction clutch, but contains a one-way clutch. Before starting an upshift from an initial gear to a higher gear, one power path is set for a slightly lower speed ratio than the initial gear by engaging synchronizers or dog clutches, thereby causing the one-way clutch to overrun. In order to transfer power to the second torque path, the friction clutch is released and the secondary power path carries torque through the one-way clutch. Transfer of torque to the secondary power path is essentially a downshift to a speed ratio that is slightly lower than the current or off-going gear ratio.

While the secondary power path carries torque, the main or primary power path is set similarly for the destination gear of the gearshift by engaging synchronizers or dog clutches. When the friction clutch is re-engaged, torque is transferred back to the primary torque path causing the one-way clutch to overrun again. Downshifts are accomplished by reversing this sequence of steps.

All the gear ratio changes including the acceleration of the vehicle from a stop or idle condition, usually referred to as "launch," use the same friction clutch. The only additional hardware required is a one-way clutch, the gearing, and a coupler on a second layshaft associated with the secondary torque path.

The principle of the present invention can be applied to all of the up-shifts of a particular transmission or any number of the up-shifts depending upon the number of secondary torque paths that are provided.

In realizing these advantages, a power transmission for a motor vehicle includes an input and output. A first layshaft supports a first pinion, a second layshaft supports a second pinion, and an intermediate layshaft carries a gear secured in meshing engagement with the first pinion and the second pinion. A first power path driveably connects the input and first layshaft, and a second power path driveably connects the input and second layshaft through a one-way drive connection, such as an overrunning clutch. First and second couplers releasably couple the first pinion and first layshaft, and the second pinion and second layshaft, respectively. A speed reduction power path is driveably connected to the intermediate layshaft. A range coupler couples the output alternately to the speed reduction power path and the intermediate layshaft. A clutch alternately connects and disconnects the input and the first power path.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a chart containing an example of the number of teeth for each of the gears and pinions shown in FIG. 1;

FIG. 3 is a chart containing the torque ratios between the input and output through the primary power path for each of the forward drive and reverse drive gears of the transmission of FIG. 1, the gears and pinions having the number of teeth shown in FIG. 2; and FIG. 4 is a chart containing the alternate torque ratios between the input and output through the secondary power path for each of the forward drive gears of the transmission of FIG. 1, the gears and pinions having the number of teeth shown in FIG. 2.

DETAILED DESCRIPTION OF THE PREFERRED EMBODIMENT

Figure 1:
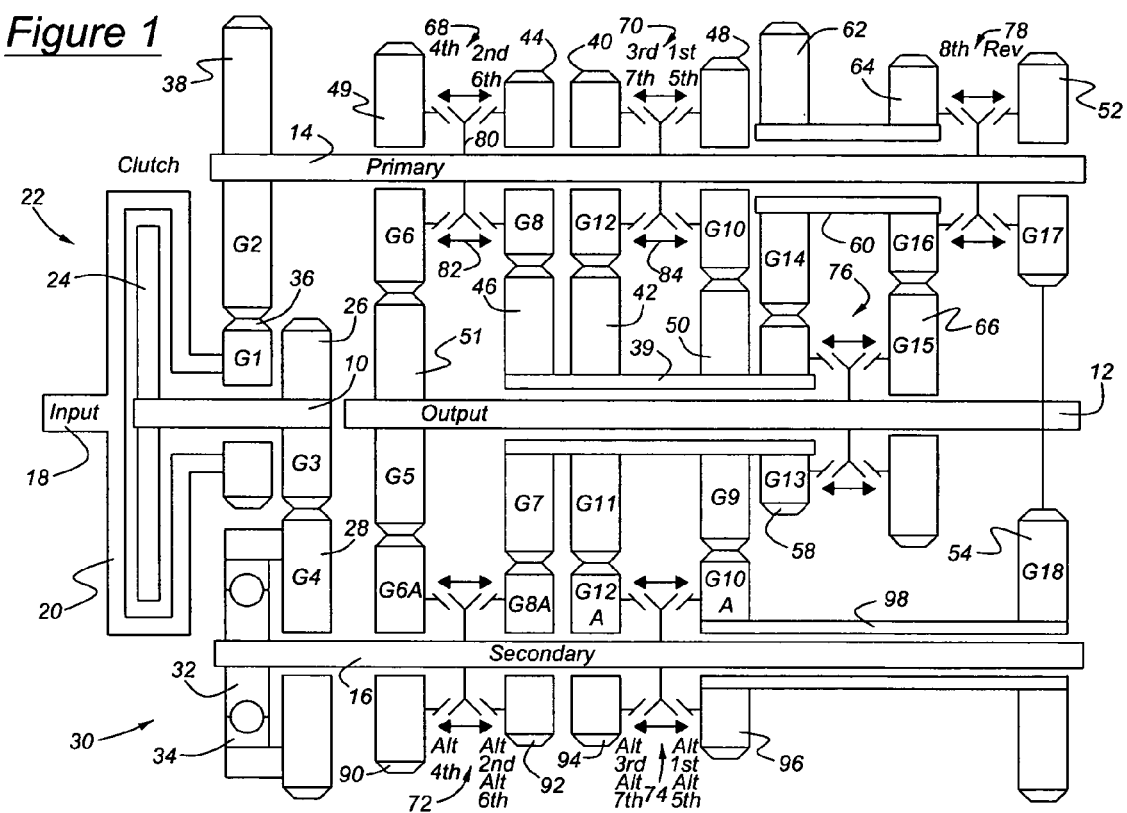
FIG. 1 is a schematic diagram showing the gear arrangement of the transmission according to the present invention.

Referring now to FIG. 1 a transmission according to the present invention includes an input 10 adapted for connection to a power source, such as an internal combustion engine or electric motor, and an output 12 adapted for connection to a load, such as the wheels of a motor vehicle connected through a powertrain that may include a drive shaft, differential mechanism, and axle shafts.

A primary layshaft 14 and secondary layshaft 16, arranged substantially parallel to the output 12, each supports pinions that are in continually meshing engagement with gears located coaxially with the output 12.

A clutched input 18, preferably substantially aligned with output 12, is releasably connected to input 10 through a friction clutch 22, whose output element 20 frictionally engages the clutch's input element 24, which is drivably connected to input 10.

A pinion 26, secured to input 10, is engaged with a gear 28, which is journalled on secondary layshaft 16. A one-way clutch 30, also supported rotatably on layshaft 16, has an inner race 32 secured to layshaft 16 and an outer race 34 drivably connected to gear 28. A pinion 36, secured to clutched input 18, is in continual meshing engagement with a gear 38, which is secured to primary layshaft 14.

In this way, a primary power path having a speed ratio that is approximately 0.811, when pinion 36 and gear 38 have the number of teeth specified in FIG. 2, is established between input 10 and layshaft 14 whenever clutch 22 is engaged. The primary power path drives layshaft 14 at approximately 0.811 times the speed of input 10. A secondary power path having a speed ratio of approximately 0.795, when pinion 26 and gear 28 have the number of teeth specified in FIG. 2, is established between layshaft 16 and input 10. Clutch 30 drivably connects gear 28 and layshaft 16 when input 10 drives layshaft 16, and clutch 30 overruns when the speed of layshaft 16 exceeds the speed of gear 28. When clutch 30 is driving, the secondary power path drives layshaft 16 at approximately 0.795 times the speed of input 10.

Spaced axially along an intermediate layshaft 39 are gear elements of pinion-gear sets, each member of a set being in continuous meshing engagement with another member of the set, and each set being associated with at least one speed ratio. For example, pinion 40, which is journalled on layshaft 14, is in continuous meshing engagement with gear 42, which is rotatably supported on layshaft 39. Pinion 40 and gear 42 are associated with the third and seventh forward speed ratios. Pinion 44, journalled on layshaft 14, is in continuous meshing engagement with gear 46, which is rotatably supported on layshaft 39. Pinion 44 and gear 46 are associated with the second and sixth forward speed ratios. Pinion 48, journalled on layshaft 14, is in continuous meshing engagement with gear 50, which is rotatably supported on layshaft 39. Pinion 48 and gear 50 are associated with the first and fifth forward gear ratios. Pinion 49, journalled on layshaft 14, meshes with gear 51, which is secured to output 12. Pinion 49 and gear 51 are associated with the fourth forward speed ratio.

Spaced axially along layshaft 16 are pinions, each pinion identical to a corresponding pinion on layshaft 14 and in continuous meshing engagement with the corresponding gear on layshaft 39 or output 12, and each associated with at least one alternate speed ratio. For example, pinion 94 is in continuous meshing engagement with gear 42, which is rotatably supported on layshaft 39. Pinion 94 and gear 42 are associated with the third and seventh alternate forward speed ratios. Pinion 92 is in continuous meshing engagement with gear 46, which is rotatably supported on layshaft 39. Pinion 92 and gear 46 are associated with the second and sixth alternate forward speed ratios. Pinion 96 is in continuous meshing engagement with gear 50, which is rotatably supported on layshaft 39. Pinion 96 and gear 50 are associated with the first and fifth alternate forward gear ratios. Pinion 90 meshes with gear 51, which is secured to output 12. Pinion 90 and gear 51 are associated with the fourth alternate forward speed ratio.

Reverse pinion 52, which is rotatably supported on layshaft 14, is in continuous meshing engagement with reverse idler gear 54, which is connected by intermediate layshaft 98 to pinion 96.

Also spaced along the axis of output 12 is a speed reduction and torque multiplication power path, which includes a pinion 58 supported on intermediate layshaft 39, another layshaft 60 journalled on layshaft 14, gear 62 secured to layshaft 60 and meshing with pinion 58, pinion 64 secured to layshaft 60, and gear 66 meshing with pinion 64 and journalled on output 12. Pinion 58 is in continuous meshing engagement with gear 62. In addition to forming part of the speed reduction power path, gears 62 and 58 are associated with the eighth forward speed ratio.

Couplers 68, 70, 72, 74, 76 and 78, are preferably synchronizers of the type used in manual automotive transmissions to connect a gear or pinion to a shaft after first synchronizing the speed of the shaft and that of the pinion or gear. A coupler may also be disengaged from the associated pinion or gear. An example of such a synchronizer is disclosed in U.S. Pat. No. 4,222,281. Alternatively, the couplers may be a toothed clutch having dog teeth that are engaged with clutch teeth on a gear or pinion. This invention may use couplers in any combination of synchronizers and dog clutches.

Each coupler is secured by a hub to a layshaft. For example, coupler 68 is secured by hub 80 to layshaft 14 for rotation at the speed of that layshaft. In the case where a coupler is a synchronizer, it will be provided with a conical surface which engages mutually with a corresponding conical surface respectively, on the pinions located adjacent the synchronizer. When coupler 68 is engaging either of its associated pinions, 44, 49, these conical surfaces are forced together into frictional contact, and that engagement synchronizes the speed of layshaft 14 to that of the pinion. Generally the synchronizer is equipped with a sleeve 82 supported on the hub 80 for sliding movement leftward and rightward into engagement with dog teeth carried on the pinion. When the dog teeth of the sleeve engage those of the pinion, the pinion is connected to the layshaft.

In the case where the coupler is a clutch, movement of the sleeve 82 causes mutual engagement of dog teeth formed on the sleeve and dog teeth carried on the pinions, such that a drive connection is made between the pinion and the layshaft, but without first synchronizing the speed of the layshaft and the pinion.

In FIG. 1 the couplers 68, 70, 72, 74, 76, 78 are shown in a neutral position, between the left-hand and right-hand extremities of travel of the connecting element or sleeve, whose engagement with the dog teeth carried on the pinions completes the drive connection of the pinion and associated layshaft.

The hubs of couplers 68, 70, 78 are rotatably secured to layshaft 14; the hubs of couplers 72, 74 are rotatably secured to layshaft 16; and the hub of coupler 76 is secured to output 12.

A coupler 68, located between pinions 44 and 49, releasably connects alternately those pinions and layshaft 14, and coupler 68 may be disengaged from both pinions. Coupler 70, located between pinions 40 and 48, alternately produces a drive connection between layshaft 14 and the selected pinion, and coupler 80 may be disengaged from both pinions. Coupler 78 includes a hub driveably connected and supported for rotation on the layshaft 14. Coupler 78, located between pinions 64 and 52, selectively produces a drive connection between layshaft 14 and those pinions. Couplers 72, 74 are secured to layshaft 16 and connect the adjacent pinions, 90, 92 and 94, 96, respectively, to layshaft 14. Range selection coupler 76, located between intermediate layshaft 39 and gear 66, alternately produces a drive connection between output 12 and the selected element.

Gears 46, 42, 50 and 58 are secured to intermediate layshaft 39, but gear 51 is secured to output 12.

Operation of the transmission will be discussed with reference to the positional states of the couplers and the applied or released state of clutch 22. The transmission is prepared for forward acceleration of the vehicle from rest in the first gear ratio when the engagement sleeve 84 of coupler 70 is moved rightward, the sleeve of range selection coupler 76 is also moved rightward, the other couplers are in the neutral position, and clutch 22 is disengaged. The power source continually drives input 10. Pinion 26 is driven by the power source, and gear 28 is driven by pinion 26 at the speed ratio of the secondary power path, i.e., 0.795 times the speed of input 10, provided the gears and pinions have the sizes of the example of FIG. 2. However, since couplers 72 and 74 are in the neutral position, no power is transferred through the secondary power path to output 12. Coupler 70 is disposed for first gear operation when its sleeve engages pinion 48, and the range coupler 76 is in the low range position with its sleeve engaging low range gear 66. Coupler 76 stays in the low range for first, second, third and reverse gear operation. It engages gear 58 in the fifth, sixth, seventh and eighth gears. When clutch 22 is engaged, primary layshaft 14 is driven through input 10, clutch 22, pinion 36, and gear 38 at the speed ratio of the primary power path, i.e., 0.811 times the speed of input 10. Output 12 is driven from layshaft 14 through coupler 70, pinion 48, gear 50, layshaft 39, pinion 58, gear 62, layshaft 60, pinion 64, gear 66 and coupler 76. In the first forward speed ratio, output 12 is driven at a torque ratio of 5.217.

An upshift from the first to the second speed ratio is accomplished in a series of steps that begins by moving the engagement sleeve of coupler 74 rightward to drivably connect pinion 96 and the secondary layshaft 16. This action causes one-way clutch 30 to overrun or permits it to continue to overrun. Then clutch 22 is released, thereby causing one-way clutch 30 to driveably connect layshaft 16 and gear 28, which drives layshaft 39 through gear 50 at a slightly lower speed ratio than that-of the first gear ratio. Power continuous to flow from layshaft 39 to output 12 through the speed reduction power path. Next, the sleeve of coupler 70 is moved from the right-hand position to the neutral position, and sleeve 82 of coupler 68 moves rightward, thereby drivably connecting pinion 44 and layshaft 14. Output 12 remains driven through the secondary power path. Clutch 22 is then engaged, causing one-way clutch 30 to overrun, and driving output 12 through the primary power path: pinion 36, gear 38 and layshaft 14, which then drives pinion 44, gear 46 layshaft 39. Finally, layshaft 39 drives coupler 76 and output 12 through the speed reduction path: pinion 58, gear 62, layshaft 60, pinion 64, and gear 66. Moving the sleeve of coupler 74 to the neutral position, i.e., out of engagement with pinion 96 completes the upshift to the second speed ratio from the first speed ratio.

An upshift from a second speed ratio to the third speed ratio is similarly accomplished in a series of steps that begins by moving the sleeve of coupler 72 to the right-hand position from the neutral position, thereby driveably connecting pinion 92 and layshaft 16. With the transmission components so disposed, clutch 22 is engaged and one-way clutch 30 overruns. Clutch 22 is then released and power is transferred to the secondary power path, pinion 92 and gear 46 at a slightly reduced speed ratio.

Next, the selector sleeve of coupler 68 is moved to the neutral position and the selector sleeve of coupler 70 is moved to the left-hand position, thereby drivably connecting layshaft 14 and pinion 40. The output remains driven through the secondary power path. Then clutch 22 is engaged, which causes one-way clutch 30 to overrun and output 12 to be driven again through the primary power path, pinion 40, gear 42, layshaft 39, pinion 58, gear 62, layshaft 60, pinion 64, gear 66 and coupler 76 at the third forward speed ratio. Finally the upshift to the third speed ratio is completed by disengaging the secondary torque delivery path upon moving the selector element of coupler 72 to the neutral position.

An upshift from the third to the fourth forward speed ratio begins with the step of using coupler 74 to driveably connect pinion 94 and layshaft 16. Then clutch 22 is disengaged causing one-way coupling 30 to driveably connect input 10 and layshaft 16 through the secondary power path, pinion 26 and gear 28, causing the output 12 to be driven at a slightly lower speed ratio than that of third gear. Coupler 70 is moved to the neutral position away from engagement with pinion 40, and the sleeve of coupler 68 is moved leftward to driveably connect pinion 49 and layshaft 14. After these steps are completed, clutch 22 is engaged, thereby causing coupling 30 to overrun and driveably connecting input 12 through gear 51 and pinion 49, the primary power path, gear 38, and pinion 36 and clutch 22. Finally, coupler 74 is returned to the neutral state by disengaging its sleeve from pinion 94.

While the transmission is in the fourth forward speed ratio, the range coupler 76 may be moved without interrupting the flow of power.

An upshift to the fifth ratio from the fourth ratio begins by moving the sleeve of coupler 72 leftward to driveably connect pinion 90 and layshaft 16, and moving the sleeve of the range coupler 76 leftward to the high range position, whereby gear 58 is driveably connected to the output 12. Clutch 22 is disengaged, which causes coupling 30 to produce a drive connection between layshaft 16 and input 10 through the secondary power path. With the transmission disposed in this way, the output is driven at a slightly lower speed ratio than that of the fourth speed ratio. The transmission is prepared for the fifth speed ratio by returning coupler 68 to the neutral position and moving the sleeve of coupler 70 rightward to connect pinion 48 and layshaft 14. Then clutch 22 is engaged and coupling 30 overruns. The torque delivery path for the fifth speed ratio includes input 10, pinion 36, gear 38, layshaft 14, coupler 70, pinion 48, gear 50, intermediate layshaft 39, coupler 76 and output 12.

Finally, coupler 72 is returned to the neutral position by moving its selector sleeve rightward away from pinion 90.

An upshift to the sixth speed ratio begins by moving the sleeve of coupler 74 rightward to driveably connect layshaft 16 and intermediate layshaft 39 through pinion 96 and gear 50. Then clutch 22 is disengaged, and the output 12 is driven from input 10 through coupling 30, the secondary drive path, coupler 74, pinion 96, gear 50, layshaft 39, and coupler 76. Then the transmission is prepared for operation in the sixth speed ratio by returning coupler 70 to the neutral state and moving the sleeve of coupler 68 rightward to driveably connect layshaft 14 and intermediate layshaft 39 through pinion 44 and gear 46. Then clutch 22 is engaged, coupling 30 overruns, and so that the torque delivery path from coupler 68 through coupler 76 to output 12 is completed. Finally, coupler 74 is returned to the neutral position by moving its sleeve leftward away from pinion 96.

An upshift to the seventh ratio from the sixth ratio begins by moving the sleeve of coupler 72 rightward to driveably connect layshaft 16 to output 12 through coupler 72, pinion 92, gear 46, intermediate layshaft 39, gear 58 and coupler 76. That torque delivery path is then activated by disengaging clutch 22, which causes coupler 30 to produce a drive connection between input 10 and layshaft 16. The transmission is prepared to operate in the seventh forward speed ratio by returning coupler 68 to the neutral position and moving the selector sleeve of coupler 70 leftward to driveably connect layshaft 14 and pinion 40. Clutch 22 is engaged, and coupler 30 overruns. The torque delivery path in the seventh forward speed ratio includes input 10, pinion 36, gear 38, layshaft 14, coupler 70, pinion 40, gear 42, layshaft 39, gear 58, coupler 76, and output 12. Coupler 72 is then returned to the neutral position by moving its sleeve leftward away from pinion 92.

An upshift to the eighth ratio from the seventh ratio begins by moving the sleeve of coupler 74 leftward to driveably connect layshaft 16 to output 12 through coupler 74, pinion 94, gear 42, intermediate layshaft 39, gear 58 and coupler 76. That torque delivery path is then activated by disengaging clutch 22, which causes coupler 30 to produce a drive connection between input 10 and layshaft 16. The transmission is prepared to operate in the eighth forward speed ratio by returning coupler 70 to the neutral position and moving the selector sleeve of coupler 78 leftward to driveably connect layshaft 14 and pinion 62, which is supported on layshaft 60. Clutch 22 is engaged, and coupler 30 overruns. The torque delivery path in the seventh forward speed ratio includes input 10, pinion 36, gear 38, layshaft 14, coupler 68, layshaft 60, pinion 62, gear 58, layshaft 39, gear 58, coupler 76, and output 12.

The torque delivery path in reverse gear between input 10 and output 12 includes pinion 36, gear 38, layshaft 14, coupler 78, reverse pinion 52, reverse gear 54, reverse layshaft 98, pinion 96, gear 50, intermediate layshaft 39, pinion 58, gear 62, layshaft 60, pinion 64, output gear 66, and coupler 76.

The torque ratios set out in FIGS. 3 and 4 represent an example of the primary and alternate torque ratios that would result from the embodiment of FIG. 1 using the gear and pinion sizes of FIG. 2.

The one-way clutch 30 which produces a one-way drive connection between gear 28 and secondary layshaft 16 may be any of the following: a sprag-type one-way clutch, a roller-type one-way clutch, a mechanical diode of the type described in U.S. Pat. Nos. 5,070,978; 5,597,057 and 6,065,576; or a hydraulically actuated friction clutch having an engaged state wherein the second layshaft and input are driveably connected and a disengaged state wherein the second layshaft and input are driveably disconnected.

Either the primary power path or alternate power path may be used during steady state driving. Whenever the primary power path is carrying power, the alternate power path may be in neutral or configured for the corresponding gear or any lower gear. Range coupler 76 transmits torque in every gear except fourth and alternate fourth. In order to change the state of range coupler 76 without interrupting power flow to the output 12, power must be carried by either the fourth gear path or the alternate fourth gear path. This imposes a shift restriction that allows no direct upshifts from a gear lower than fourth gear to a gear higher than fourth gear. Similarly, no direct downshift may be made from a gear higher than fourth gear to a gear lower than fourth gear. Other than this restriction, all shifts may be made directly without engaging any intermediate gear.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A mulitiple speed power transmission, comprising:
an input;
an output;
a first layshaft supporting a first pinion thereon;
a first power path for driveably connecting the input and first layshaft;
a first coupler for releasably coupling the first pinion and first layshaft;
a second layshaft supporting a second pinion thereon;
a second power path for driveably connecting the input and second layshaft through a one-way drive connection,
a clutch for alternately connecting and disconnecting the input and the first power path;
a second coupler for releasably coupling the second pinion and second layshaft;
an intermediate layshaft having a first gear secured thereto, the gear being in meshing engagement with the first pinion and the second pinion;
a speed reduction power path driveably connected to the intermediate layshaft; and
a range coupler for coupling the output alternately to the speed reduction power path and the intermediate layshaft.

2. The transmission of claim 1, further comprising:
a third pinion supported for rotation on the first layshaft and releasably coupled to the first layshaft by the first coupler;
a fourth pinion supported for rotation on the second layshaft and releasably coupled to the second layshaft by the second coupler;
a second gear secured to the output in meshing engagement with the third and fourth pinion.

3. The transmission of claim 1, wherein:
the first power path comprises a third pinion secured to the input, and a third gear secured to the first layshaft in meshing engagement with the third pinion; and
the second power path comprises a fourth pinion driveably connectable to the input, and a fourth gear supported on the second layshaft in meshing engagement with said fourth pinion.

4. The transmission of claim 1, wherein the first power path produces a first ratio of the rotational speeds of the first layshaft and input, and the second power path produces a second ratio of the rotational speeds of the second layshaft and input that is less than the first speed ratio.

5. The transmission of claim 1, wherein the one-way drive connection is a member of the group consisting of a one-way clutch, a sprag one-way clutch, a roller-one-way clutch, a mechanical diode, and a hydraulically actuated friction clutch having an engaged state wherein the second layshaft and input are driveably connected and a disengaged state wherein the second layshaft and input are driveably disconnected.

6. The transmission of claim 1, wherein the speed reduction power path comprises:
a fifth pinion secured to the intermediate layshaft;
a fifth gear meshing with the fifth pinion;
a sixth pinion driveably connected to the fifth gear; and
a sixth gear meshing with the sixth pinion.

7. The transmission of claim 6, wherein the fifth pinion and sixth gear are alternately connected and disconnected by the range coupler to the output.

8. The transmission of claim 6, wherein:
the sixth gear and fifth pinion are journalled on the first layshaft; and further comprising
a third coupler supported on the first layshaft for alternately mutually connecting and disconnecting the first layshaft and sixth pinion.

9. The transmission of claim 6, wherein:
the sixth gear and fifth pinion are journalled on the first layshaft; and further comprising
a reverse pinion journalled on the first layshaft;
a reverse gear meshing with the reverse pinion;
a second reverse pinion driveably connected to the reverse gear, journalled on the second layshaft, and driveably connected to the fifth pinion; and
a third coupler supported on the first layshaft for alternately mutually connecting and disconnecting the sixth pinion and reverse pinion to the first layshaft.

10. The transmission of claim 1, wherein the first coupler, second coupler, third coupler and range coupler are synchronizers.

11. The transmission of claim 1, wherein the first coupler, second coupler, third coupler, and range coupler are members of a group consisting of synchronizers and dog clutches.

12. The transmission of claim 1, wherein the clutch is a friction clutch.

13. A multiple speed ratio power transmission, particularly for motor vehicles, comprising:
an input;
an output;
a first layshaft supporting a first set of pinions thereon;
a first power path fair driveably connecting the input and first layshaft;
a first coupler having a selectable coupling member supported for movement on the first coupler, the first coupler releasably coupling a pinion of the first pinion set and said first layshaft in response to movement of the coupling member;
a second layshaft supporting a second set of pinions thereon;
a second power path for driveably connecting the input and the second layshaft through a one-way drive connection;
a clutch for alternately connecting and disconnecting the input and the first power path;
a second coupler having a selectable second coupling member supported for movement on the second coupler, the second coupler releasably coupling a pinion of the second pinion set and said second layshaft in response to movement of the second coupling member; and
an intermediate layshaft supporting a set of gears secured thereto, each gear of the set of gears being in meshing engagement with a pinion of the first pinion set and a pinion of the second pinion set;
a speed reduction power path driveably connected to the intermediate layshaft; and
a range coupler for coupling the output alternately to the speed reduction power path and the intermediate layshaft.

14. The transmission of claim 13, further comprising:
a third pinion supported for rotation on the first layshaft and releasably coupled to the first layshaft by the first coupler;
a fourth pinion supported for rotation on the second layshaft and releasably coupled to the second layshaft by the second coupler;
a second gear secured to the output in meshing engagement with the third and fourth pinion.

15. The transmission of claim 13, wherein:
the first power path comprises a third pinion secured to the input, and a third gear secured to the first layshaft in meshing engagement with the third pinion; and
the second power path comprises a fourth pinion driveably connectable to the input, and a fourth gear supported on the second layshaft in meshing engagement with said fourth pinion.

16. The transmission of claim 13, wherein the first power path produces a first ratio of the rotational speeds of the first layshaft and input, and the second power path produces a second ratio of the rotational speeds of the second layshaft and input that is less than the first speed ratio.

17. The transmission of claim 13, wherein the one-way drive connection is a member of the group consisting of a one-way clutch, a sprag one-way clutch, a roller-one-way clutch, a mechanical diode, and a hydraulically actuated friction clutch having an engaged state wherein the second layshaft and input are driveably connected and a disengaged state wherein the second layshaft and input are driveably disconnected.

18. The transmission of claim 13, wherein the speed reduction power path comprises:
a fifth pinion secured to the intermediate layshaft;
a fifth gear meshing with the fifth pinion;
a sixth pinion driveably connected to the fifth gear; and
a sixth gear meshing with the sixth pinion.

19. The transmission of claim 18, wherein the fifth pinion and sixth gear are alternately connected and disconnected by the range coupler to the output.

20. The transmission of claim 18, wherein:
the sixth gear and fifth pinion are journalled on the first layshaft; and further comprising
a third coupler supported on the first layshaft for alternately mutually connecting and disconnecting the sixth pinion and the first layshaft.

21. The transmission of claim 18, wherein:
the sixth gear and fifth pinion are journalled on the first layshaft; and further comprising
a reverse pinion journalled on the first layshaft;
a reverse gear meshing with the reverse pinion;
a second reverse pinion driveably connected to the reverse gear, journalled on the second layshaft, and driveably connected to the fifth pinion; and a third coupler supported on the first layshaft for alternately mutually connecting and disconnecting the sixth pinion and the reverse pinion to the first layshaft.

22. The transmission of claim 13, wherein the first coupler, second coupler, third coupler, and range coupler are members of a group consisting of synchronizers and dog clutches.

23. The transmission of claim 13, further comprising:
primary pinion-gear pairs, the pinions of said primary pairs being supported on, and spaced mutually along the first layshaft, the gears of said primary pairs being in engagement with the pinions of said primary pairs, journalled on, and spaced mutually along the intermediate layshaft; and
primary couplers connected to the first layshaft, each primary coupler having a selectable coupling member supported for movement on the corresponding primary coupler, for releasably coupling a pinion of the primary pinion-gear pairs and said first layshaft in response to movement of said coupling member.

24. The transmission of claim 23, further comprising:
secondary pinions supported on, and spaced mutually along the second layshaft, each secondary pinion being engaged with a gear of a primary pinion-gear pair; and
secondary couplers connected to the second layshaft, each secondary coupler having a selectable coupling member supported for movement on a corresponding secondary coupler for releasably coupling a secondary pinion and said second layshaft in response to movement said coupling member.

25. A multiple speed power transmission, comprising:
an input;
an output;
an intermediate layshaft;
primary power paths for driveably connecting the input and intermediate layshaft such that power can be transferred among the primary power paths without interruption;
a low range power path for driveably connecting the intermediate layshaft and the output;
a high range power path for driveably connecting the intermediate layshaft and the output at a high a output speed ratio than the low range power path;
a bypass power path for driveably connecting the input and the output such that power can be transferred without interruption between the bypass power path and the primary power paths with the lowest and highest speed ratios;
a range coupler for alternately activating either the low range or high range power path.

26. The transmission of claim 25, wherein the bypass power path produces an output speed ratio greater than the combination of any of the primary power paths with the low range power path and less than the combination of any of the primary power paths with the high range power path.

27. The transmission of claim 25, wherein the high range power path is a direct connection.

28. The transmission of claim 25, wherein the low range power path includes one or more pairs of meshing gears.

29. The transmission of claim 25, wherein the primary power paths include a common clutch, and power is transferred between two primary power paths by temporarily transferring the power to an alternate power path between the input and the intermediate layshaft.

30. The transmission of claim 25, wherein the bypass power path and a primary power path having a highest speed ratio include a common clutch, and power is transferred between the bypass power path and said primary power path having a highest speed ratio by temporarily transferring power to an alternate power path between the input and the intermediate layshaft.

31. The transmission of claim 25, wherein:
a first primary power path has a lower speed ratio than a second primary power path;
the bypass power path and the first primary power path include a common clutch; and
power is transferred between the bypass power path and the first primary power path by transferring power to an alternate power path between the input and the output.

* * * * *